United States Patent [19]

Chou

[11] 4,395,998
[45] Aug. 2, 1983

[54] MULTI-FUEL GASIFIER SYSTEM FOR SPARK IGNITION ENGINES

[75] Inventor: You-May Chou, Taipei Hsien, Taiwan

[73] Assignee: How Tong Industrial Co. Ltd., Taipei, Taiwan

[21] Appl. No.: 271,854

[22] Filed: Jun. 9, 1981

[51] Int. Cl.³ ............................................ F02B 13/00
[52] U.S. Cl. .................................. 123/575; 123/557; 123/543; 123/544; 123/525
[58] Field of Search ............... 123/525, 1 A, 526, 527, 123/557, 575, 576–590, 544–545

[56] References Cited

U.S. PATENT DOCUMENTS

| | | | |
|---|---|---|---|
| 4,056,087 | 11/1977 | Boyce | 123/576 |
| 4,276,864 | 7/1981 | Waschkuttis | 123/557 |
| 4,323,046 | 4/1982 | Barber | 123/575 |

*Primary Examiner*—Charles J. Myhre
*Assistant Examiner*—E. Rollins Cross
*Attorney, Agent, or Firm*—Holman & Stern

[57] ABSTRACT

A multi-fuel gasifier system for internal combustion engines comprising a hollow casing having heat conducting plates therein in thermal contact with a heat exchange duct passing through the casing through which hot exhaust gas passes from the exhaust manifold to the exhaust pipe, a gasifying chamber substantially centrally located within the casing and surrounded by the heat conducting plates and defined by inner wall portions of the plates. An inlet in the casing wall communicates with one end of the chamber and the outlet of the carburetor. An outlet through the casing wall communicates with the other end of the chamber and the intake manifold of the engine. Adjacent the inlet end of the chamber is a first perforated vaporization cap through which fuel-air mixture from the carburetor passes and thereafter contacts a second conically shaped vaporization cap which deflects and sprays the fuel mixture into the vaporization chamber. Downstream of the conical vaporization cap is a second high temperature vaporization section of the chamber which is defined by that portion of the chamber surrounded by the inner walls of the heat conducting plates. An auxiliary fuel tank is provided and is connected to a pre-heating fuel line extending through the heat exchange pipe and coiled around the second high temperature vaporization section of the chamber so that fuel fed through one end is heated before passing to the carburetor inlet where it is mixed with the primary fuel prior to being mixed with air in the caburetor and passed into contact with the vaporization caps and through the gasification chamber of the gasifier. This invention is particularly useful for gasifying lower grade fuels such as diesel oil, or kerosine, for use in IC engines and for mixing lower grade fuels with gasoline for increasing power, efficiency, and economy of operating IC engines.

4 Claims, 6 Drawing Figures

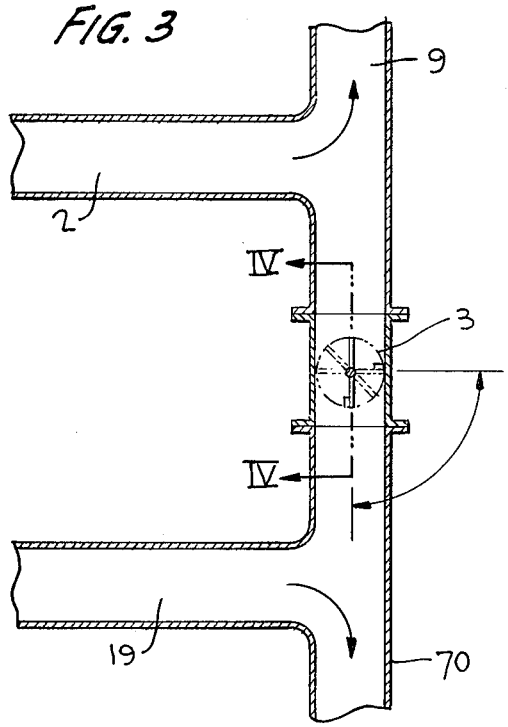
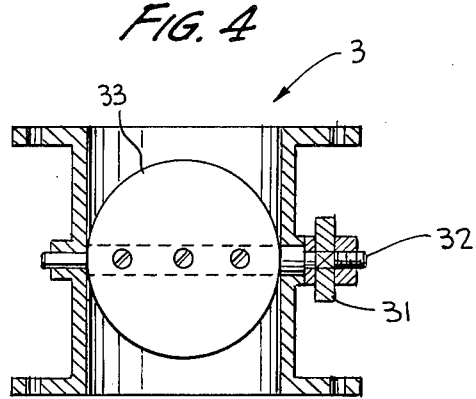
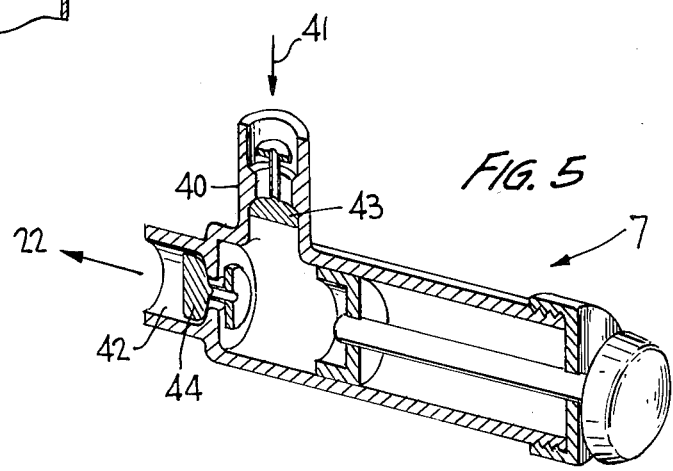
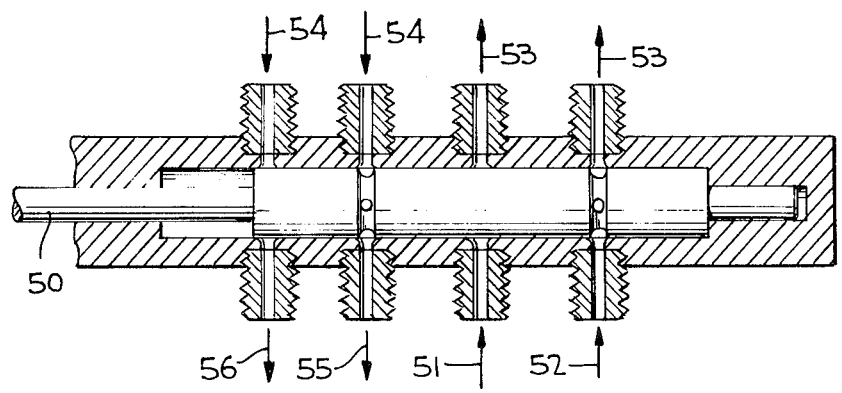

MULTI-FUEL GASIFIER SYSTEM FOR SPARK IGNITION ENGINES

FIELD OF THE INVENTION

This invention relates to multi-fuel gasifier systems used for spark type internal combustion engine.

BACKGROUND OF THE INVENTION

The spark ignition gasoline engine is generally used for small vehicles, and in the foreseeable future, such use will continue to prevail. Since the crisis of energy shortage is going to increase with each passing day, how to save fuel is naturally of very great importance in our daily life. Therefore, to modify the existing spark ignition gasoline engine to increase its efficiency and so that it can use more than one type of fuel for the purpose of saving energy has become more and more significant to the world than ever before.

In using multi-fuels, such as kerosene, diesel fuel, mixed oil or alcohol in gasoline engines, the first problem encountered is that the amount of air to be mixed for each kind of fuel is different as a result of the difference in individual molecular weight; and the second problem is that the conditions required for overcoming the knock combustion problems of individual kinds of fuel are not the same. These two problems can be solved by the concept of this invention saving fuel.

BRIEF SUMMARY OF THE INVENTION

In solving the problems of different molecular weights of different fuels and the knock combustion generated by different kinds of fuels, the main technical method is to thoroughly evaporate the atomized fuel coming from the carburetor and to ignite it with a lower flash point temperature; in other words, the charge entered into the cylinder for combustion is in gaseous state. From a combustion point of view, an analysis and explanation are given as follows:

It is given: Gasoline = $C_8H_{18}$  Diesel = $C_{16}H_{30}$
Kerosene = $C_{12}H_{26}$  Alcohol = $CH_3OH$.

The relative main data are shown in Table 1.

TABLE 1

| | FUEL DATA | | | |
|---|---|---|---|---|
| | GASOLINE ($C_8H_{18}$) | KEROSENE ($C_{12}H_{26}$) | DIESEL ($C_{16}H_{30}$) | ALCOHOL ($CH_3OH$) |
| MOLECULAR WEIGHT | 114.2 | 170.3 | 215–225 | 32 |
| SPECIFIC GRAVITY A.P.I. | 70.5 | 57.5 | 39.9–33.9 | 46.2 |
| BOILING POINT 1 ATM | 258.2° F. | 421° F. | 500° F. | 151° F. |
| GASIFICATION EAD | 420° F. | 572° F. | 590–662° F. | |
| GASIFICATION E = 16:1 | 130° F. | 280° F. | 280° F. (2) | 390° F. |
| FLASH POINT ASTM D92-52 | 0° F. | 115° F. | 115° F. (2) | 62° F. |
| COMPRESSION RATIO" OF GASOLINE ENGINE (1) | 8–8.5 | (4.2) | (8.1) | (5.2) |
| HEAT VALUE (HIGHT) | 20,750 | 20,550 | 19,500 | 10,270 |
| THEORETICAL RATIO OF AIR & FUEL (A/F) | 15.19 | 15.07 | 14.58 | 6.49 |

Note 1.
With the exception of gasoline, all the compression ratios of other fuels are the critical compression ratios of their knock combustions.
Note 2.
This flash point temperature is of kerosene data (ussr = 65C)
Note 3.
The information in this table was obtained from:
1. ASTM D-86 distillation curves.
2. Daniels, Alberty; Physical Chemistry, 4th Edition (1976)
3. Hermann Baumann; Who translated Wanscheidt's (ussr) Theorieder Dieselmotorem. 5th Edition.
4. Keenan; Wood, Kleinfelter, General Chemistry (1976) 5th Edition.
5. "Petroleum Inspection Handbook" Kaohsiung Refinery Chinese Petroleum Corp.

If the engine speed is 3,600 rpm, the time required from the compression stroke to ignition is no more than 0.0074 seconds. It has been understood that during said short moment, the fuel is not completely evaporated from its partially atomized state and therefore said partially atomized fuel is again compressed into larger particles. After being ignited, the evaporated portion burns faster than the atomized portion consequently, incomplete conbustion and knock combustion takes place. According to the data in the list mentioned above, the fuel in its substantially pure state has the highest latent heat. After being mixed with excess air the heat required for complete gasification will considerably be reduced. Now, take kerosene for example; after the mixture of kerosene and air has passed through the carburetor, heat it to a temperature of 280° F. (137° C.); then, said mixture will become a combustible gas scattered in the fresh air.

The gas phase mixture is more homogeneous than the atomized mixture. Since the fuel in the cylinder is burned in the gaseous state, it might be said that the engine is similar to a gas combustion engine. It is well known that in a gas combustion engine there is little concern about the knock combustion problem; instead, the advanced ignition, or pre-ignition, becomes a problem. Now, it has been inferred that knock combustion might be minimized by converting the fuel into a gaseous state before entering it into a gasoline engine. In fact, the following factors are helpful in minimizing the knock combustion:

(1) The fuel is converted completely into a gaseous state; its ignition temperature will be lowered to the flash point.
(2) The temperature of mixture increases.
(3) The charge spreads evenly.

The critical compression ratio of knock combustion in kerosene is 4.2:1. The knock combustion problem may be solved by changing the nozzle to increase the air fraction in the mixture and by adjusting the spark advance to 15-20 crank angle. Thru experiments and improvements, if the gasoline nozzle is replaced with #120-#125, the mixture of gasoline and kerosene on a 50—50 basis is workable. Similarly, the knock combustion problem, of other mixtures of fuels can be overcome by the same method thru experiment. Summing up the aforesaid facts, it is apparent that a mixture of gasoline or other fuels may be used in a spark ignition gasoline engine on condition that they are completely vaporized. If necessary, the nozzle should be replaced, or the ignition timing should be adjusted or some control methods should be adapted. The multi-fuel gasifier of this invention allows the engine to operate a a higher efficiency of gasoline performance and to be adaptable for using other fuels as well.

Thru practical driving experiments of over 73,000 miles (120,000 km) with seven kinds of vehicles by using various kinds of fuels, such as, gasoline, a mixture of gasoline and kerosene, a mixture of gasoline and diesel fuel, kerosene, and alcohol, etc., a comparison table of mileage in using the multi-fuel gasifier is given as follows:

BRIEF DESCRIPTION OF THE DRAWINGS

The configuration and structure of the multi-fuel gasifier of this invention are shown in the attached drawings wherein:

FIG. 3 is an enlarged cross-sectional view of the section encircled by III of the heat transfer pipe system of this invention, which is used for explaining how the exhausted hot gas is guided;

FIG. 4 is an enlarged cross-sectional view of the heat valve regulator of this invention taken along line IV—IV of FIG. 3;

FIG. 5 is a perspective cross-sectional view of the manual pump used in the invention; and FIG. 6 is a cross-sectional view of the fuel changing unit of this invention.

DETAILED DESCRIPTION

Figure 1:
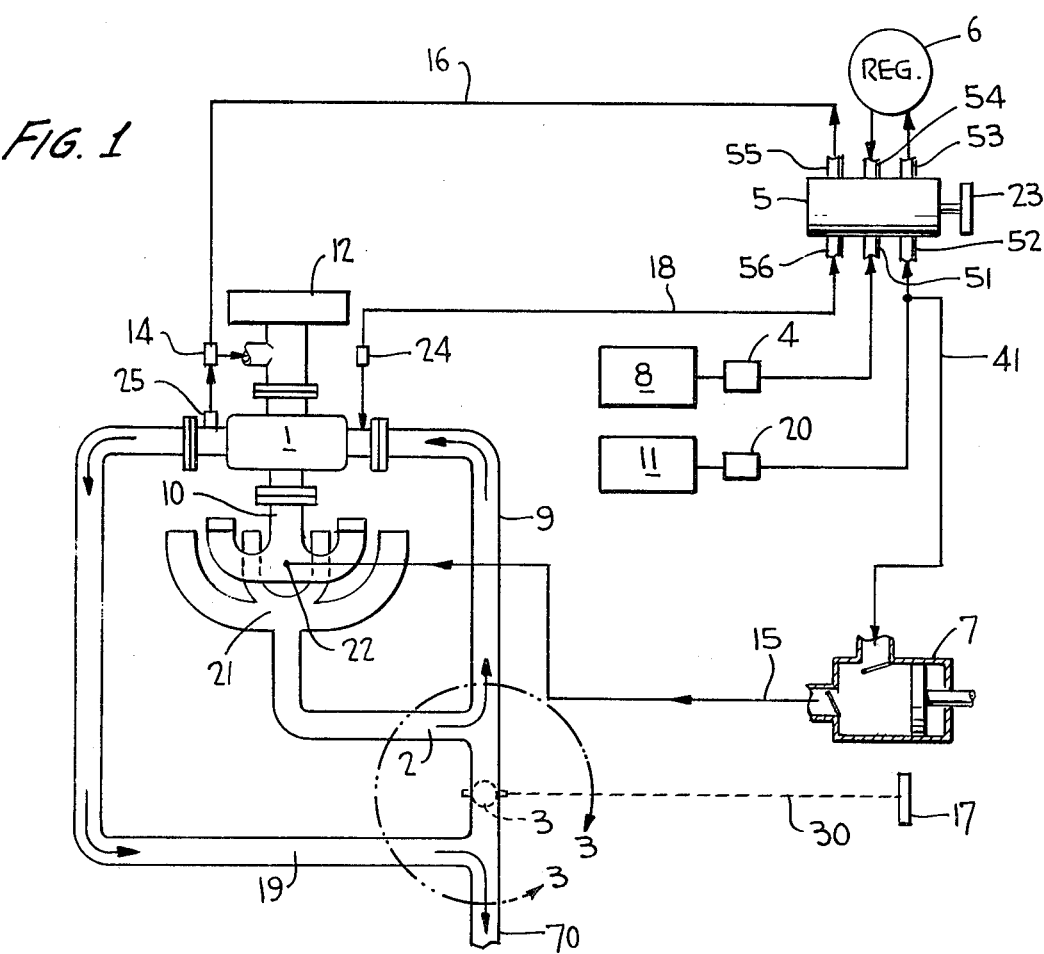
FIG. 1 is a schematic illustration showing the configuration of the multi-fuel gasifier of the invention and is used for explaining the operation of the invention.
Figure 2:
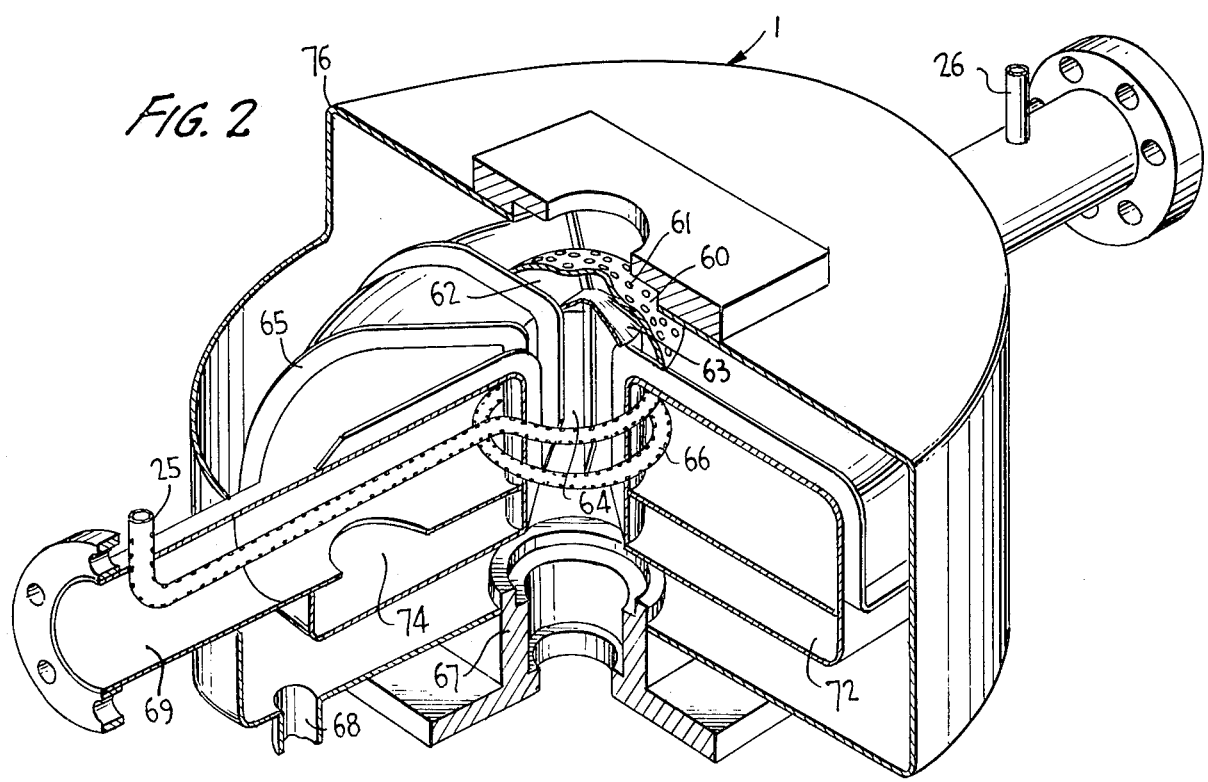
FIG. 2 is a perspective and partly diagrammatic and cross-sectional view of the multi-fuel gasifier of this invention.

The multi-fuel gasifier 1 is mounted between the intake manifold 10 and the carburetor 12 of a spark ignition engine. Asbestos gaskets and retainers are used for joining the connecting flanges of the gasifier respectively to the base of carburetor 12, the base of intake manifold 10, the heating pipe 9, and the heat exhausting pipe 19. Similarly such gaskets and retainers are used at the flange joint of the heat transfer pipe 2 and the exhaust pipe joint 21, and the flanges of the heat valve

TABLE 2

| TYPES OF VEHICLE USED FOR EXPERIMENT | EXPERIMENTAL MILEAGE | FUELS USED | | MILEAGE (%) INCREASED IN USING GASOLINE |
| --- | --- | --- | --- | --- |
| ISUZU | 2,174 | 1. | ALCOHOL | |
| | | 2. | GASOLINE & KEROSENE 50%—50% | |
| INTERNATION | 3,728 | 1. | ALCOHOL | 20% |
| | | 2. | KEROSENE | 13% |
| GMC | 8,699 | | Kerosene | |
| GMC | 10,563 | 1. | KEROSENE | |
| | | 2. | GASOLINE & KEROSENE 50%—50% | |
| | | 3. | Alcohol | |
| DODGE WEAPON's TRUCK | 11,806 | 1. | KEROSENE | |
| | | 2. | Gasoline & Kerosene 50%—50% | |
| | | 3. | Alcohol | |
| YUE LOUNG (TAIWAN) | 12,613 | 1. | Gasoline | 49% |
| | | 2. | Gasoline & Diesel 50%—50% | 43.5 |
| | | 3. | Gasoline % Kerosene 50%—50% | 21.0% |
| | | 4. | Kerosene | 7.5% |
| | | 5. | Alcohol | 35.0% |
| CHEVROLET BUS | 14,291 | | Alcohol | |

The test results shown in Table 2 are just a brief record of driving on the road and not a regular test of the engine, but the test proved thru the aforesaid mileage figures that the multifuel and saving gasifier significantly improves the combustion more than heretofore known, by completely gasifying the fuel before it enters the cylinder.

regulator 3 and the heat transfer pipe 2. The heat valve handle 17 is installed at a suitable position in the driver's cab, and is, by means of a steel cable 30, connected to the adjusting rod 31 for driving the rotatably movable axle 32 so as to manipulate the heat regulating plate 33 having five regulating steps from its fully open to completely closed condition with a view of varying the temperature of the multi-fuel gasifier 1 from $T_1$-$T_5$. The manual fuel pump 7 is installed at a suitable position in the driver's cab, and the fuel intake 40 is connected to the fuel line 41 which is also connected to the fuel changing unit 5, while the outlet 42 is connected to the nozzle added to the main gas intake pipe 22 of the gasifier. The fuel changing unit 5 is fixedly attached to the metal body at the left side of the engine chamber, and the handle 23 of the fuel changing unit 5 is installed at a suitable location in front of the driver's cab, and is connected to the movable rod 50 with a steel rod (not shown). The intake passage 51 is connected to the second fuel tank filter 4 which is, in turn connected to the second fuel tank 8. Thru the first fuel tank filter 20, the intake passage 52 is connected to the first fuel tank 11. The outlet passages 53 are connected to the intake of the original gasoline pump 6, and the intake passages 54 are connected to the outlet of said original gasoline pump 6. The outlet passage 55 is connected through line 16 to the intake pipe joint 14 of carburetor 12, and the outlet passage 56 is connected to the preheating spiral pipe joint 24 of the multi-fuel gasifier 1. The other end joint 25 is connected to the intake pipe joint of the carburetor 12.

If the first fuel tank 11 is filled with gasoline, and the second fuel tank 8 is filled with low combustion rate fuel, the handle 23 of fuel changing unit 5 is pushed, prior to starting the engine, to the end, as shown in FIG. 6; then, the gasoline in said first fuel tank 11 will go thru said first fuel tank filter 20 and enter into the intake passage 52 of the fuel changing unit 5, from which gasoline will further go thru the outlet 53, the original gasoline pump 6, the intake 59, the pipe joint 14, and finally enter into carburetor 12.

As soon as the engine is started, the mixture coming from the carburetor will go thru the air intake 10 and of the first vaporization cap 60, the plural fine holes 61, the gasifying layer 62, the second vaporization cap 63, the high temperature gasifying layer 64, the main gas intake pipe, and finally enters into the cylinder for igniting and explosion. In using gasoline as fuel for saving purpose, the fuel intake system is the same as that mentioned above but the multi-fuel gasifier 1 must be properly heated by heat from the exhaust pipe; simultaneously, the heat valve handle 17 should be adjusted to a position of 1/5-2/5 ($T_1-T_2=130°$ F.) whereby the heat being exhausted from the exhaust pipe 21 will go two ways: one part of it will go thru the heat transfer pipe 2, the heat valve regulator 3, and the exhaust pipe 70 for being exhausted out of the vehicle; the other part of it will, as result of the restriction by the heat regulating plate 33 and being absorbed by the heating pipe 9, pass into the heat accumulator 69 of the multi-fuel gasifier 1 being finally exhausted outside the vehicle thru the heat exhausting pipe 19. Heat accumulating 65 provided in the gasifier have heat accumulating effect which causes the body of the multi-fuel gasifier to reach the required temperature within about three minutes so that when the gasoline mixture spraying out from the carburetor 12, passes thru the first vaporization cap 60, the plural fine holes 61, and the second vaporization cap 63 from where the said mixture encounters resistance and is sprinkled, it will pass thru the gasifying layer 62, and the high temperature gasifying layer 64 thereby being completely gasified without any liquid particles in the mixture before entering into the cylinder. Consequently, the user can make the most of the fuel in combustion for achieving the goal of saving oil.

When using alcohol as fuel, it is filled into the first fuel tank 11 and one must replace the nozzle of the carburetor with one that is suitable to the ideal ratio (A/F=6.49) of alcohol mixture, and adjust the heat valve handle 17 to the position of 2/5-3/5 ($T_2-T_3=390°$ F.); the rest of the operating procedures are the same as that described above.

When using the gasoline in the first fuel tank 11 to start the vehicle, the engine is run for approximately three minutes; then the handle 23 of fuel changing unit 5 is pulled outwards, and the low combustible fuel (Kerosene, the mixture of gasoline and kerosene, or the mixture of gasoline and diesel) in the second fuel tank 8 is ready for use. Said low combustion rate fuel will go thru the second fuel tank filter 4, the intake passage 51, the outlet 53, the intake and outlet of the original gasoline pump 6, the intake 54, the outlet 56 and further thru oil pipe 18, the preheating spiral pipe joint 24, and finally enters through end 26 into the pre-heating spiral pipe 66 of said multi-fuel gasifier 1; since said multi-fuel gasifier 1 has been pre-heated, the pre-heating spiral pipe 66 has reached the temperature required as a result of heat conduction. The fuel is thereby heated to the temperature required, prior to passing thru the other end joint 25 of said pre-heating spiral pipe, and the intake pipe joint 14 of said carburetor into the carburetor 12. Although the burning point of the low combustible fuel is high, now it has been pre-heated to the desired temperature; therefore, when spraying out from the carburetor 12 in a mixture from a nozzle that is suitable to the ideal ratio of the specific fuel it will go thru the first vaporization cap 60 and the plural fine holes 61, and then it will be sprinkled as a result of the resistance of the second vaporization cap 63, and then will go thru the gasifying layer 62 and the high temperature gasifying layer 64 for complete gasifying before entering into the cylinder. Thru the aforesaid procedures, a fuel with low burning temperature can also be used in a gasoline engine the same as gasoline. (Since the kerosene or diesel has very low volatility, the said preheating spiral pipe has to be installed for pre-heating said fuel; however, said pre-heating means may be omitted when using alcohol.) In order to prevent any heavier fuel particles which were not gasified, from flowing outside the exhaust channel 67 at the base of the said gasifier 1, a return outlet 68 is connected to a transparent storage cup so that the user can check said storage cup at any time. The temperature of said high temperature gasifying layer 64 is produced from the exhausted gas of said heat accumulator 69; a part of it enters into the high temperature conduction chamber 72 from the base inlet of said heat accumulator 69; then, it passes thru said chamber thru two passages, being exhausted out of the other end outlet 74. That is why the said high temperature gasifying layer has a high temperature.

When using kerosene fuel, to start the engine again after being stopped, the manual pump 7 is used. Since the intake port 40 of said manual pump 7 is connected to the fuel line 41, it can directly draw fuel from the first fuel tank 11 thru intake port 40 of the manual pump with adequate pressure to pass thru the inlet valve 43, and thru outlet valve 44, the fuel line 15 and the nozzle 22 of main fuel intake pipe, and finally enter into the cylinder so that the engine can be started easily. Thru experiments, the mixture of gasoline and kerosene, and the mixture of gasoline and diesel fuel all can be used for starting the engine directly likewise, and in case of a sudden engine stop, it still can be started easily using gasoline fuel without changing the fuel or using manual pump 7 to spray the gasoline.

When using gasoline or alcohol for saving fuel, some of the accessory devices may not be used, such as, the fuel changing unit, the handle 23 of said fuel changing unit, the manual pump 7, the second fuel tank 8, the second filter 4, the lines 15 and 18, the pre-heating spiral pipe 66. Consequently, the components and the control means may be more simple then when using low combustible fuel.

The outer casing 76 of the multi-fuel gasifier 1, and said heat accumulator 69 are tightly sealed to prevent fuel leakage and to maintain the inner space in a complete vacuum state. The fuel filters 4 and 20, and the fuel pump 6 are all the original basic components of the vehicle. The connecting joints of fuel lines and parts are all general items that are well known in the art and can be purchased on the open market; therefore, it is unnecessary to give further details of these parts.

Summing up the aforesaid description, it is clear that the structure of this invention is not only novel, practical and safe, but also possesses the unique capability of using different kinds of fuels. In addition, it can save a huge amount of fuel and money, can minimize the air pollution problem, and is simple in structure and to install. Most vehicles using gasoline engines may have this invention installed because of its practical, economic, novel and advance features.

I claim:

1. A multi-fuel gasifier for internal combustion engines having a carburetor, fuel pump, fuel line to the carburetor and intake and exhaust systems, comprising, a hollow casing, an inlet to said casing adapted to be connected to the air-fuel mixture outlet of a carburetor, an outlet from said casing adapted to be connected to the engine intake manifold, a gasifying chamber within said casing between said inlet and outlet, a plurality of heat conducting plates supported in spaced relationship with respect to each other within said casing with portions thereof forming at least part of the walls defining said chamber, heat conducting pipe means extending through said casing in thermal conducting contact with said plates having an inlet adapted to be connected to the engine exhaust manifold and an outlet adapted to be connected to the exhaust pipe, a heat transfer pipe connected at its ends to said exhaust manifold and said inlet of said heat conducting pipe means respectively and between its ends to one end of a heat regulator pipe, the other end of said heat regulator pipe being connected to the exhaust pipe, a heat regulating valve in said heat regulating pipe for controlling the flow of exhaust gas through said heat transfer pipe, means for operating said heat regulating valve, an auxiliary fuel tank, an auxiliary fuel line from said auxiliary fuel tank, a pre-heating fuel line extending through at least that part of said heat conducting pipe means that is disposed within said casing and in thermal conducting relationship with the exhaust gas within said heat conducting pipe means, and said pre-heating fuel line having an inlet connected to said auxiliary fuel lines and an outlet connected to the carburetor fuel inlet.

2. A multi-fuel gasifier as claimed in claim 1 and further comprising a first vaporization cap in said chamber adjacent said chamber inlet, a plurality of perforations in said first vaporization cap for passing said fuel-air mixture therethrough, a second conically shaped vaporization cap in said chamber in a position to have fuel-air mixture passing through said first vaporization cap impinge on its surface to spray said fuel-air mixture substantially radially outwardly.

3. A multi-fuel gasifier as claimed in claim 2 and further comprising a first gasifying section in said chamber between said first and second vaporization caps, and a second high temperature gasifying section between said second vaporization cap and said casing outlet in that part of said chamber where the chamber walls are formed by said portions of said heat conducting plates.

4. A multi-fuel gasifier as claimed in claim 3 wherein said portions of said heat conducting plates that form said walls of said chamber are cylindrical, and said pre-heating fuel line is coiled at least once around said cylindrical section of said chamber.

* * * * *